US012659994B2

(12) United States Patent
Deghel et al.

(10) Patent No.: US 12,659,994 B2
(45) Date of Patent: Jun. 16, 2026

(54) CHANNEL MEASUREMENT AND REPORTING FOR MULTI-TRP

(71) Applicant: Nokia Technologies Oy, Espoo (FI)

(72) Inventors: Matha Deghel, Massy (FR); Filippo Tosato, Massy (FR); Mihai Enescu, Espoo (FI); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 379 days.

(21) Appl. No.: 18/354,254

(22) Filed: Jul. 18, 2023

(65) Prior Publication Data

US 2024/0057161 A1 Feb. 15, 2024

(30) Foreign Application Priority Data

Aug. 12, 2022 (FI) ...................................... 20225721

(51) Int. Cl.
*H04W 74/0816* (2024.01)
*H04W 24/10* (2009.01)

(52) U.S. Cl.
CPC ....... *H04W 74/0816* (2013.01); *H04W 24/10* (2013.01)

(58) Field of Classification Search
CPC .............. H04W 74/0816; H04W 24/10; H04L 5/0037; H04L 5/0048; H04B 7/022
USPC ........................................................ 370/329
See application file for complete search history.

(56) References Cited

U.S. PATENT DOCUMENTS

| | | | |
|---|---|---|---|
| 2014/0112173 A1* | 4/2014 | Hammarwall | ........ H04L 5/0091 370/252 |
| 2019/0199422 A1* | 6/2019 | Li | ........................ H04W 72/046 |
| 2020/0067631 A1 | 2/2020 | Kakishima et al. | |
| 2020/0275447 A1* | 8/2020 | Zhang | .................... H04W 72/12 |
| 2021/0028843 A1 | 1/2021 | Zhou et al. | |
| 2021/0195650 A1* | 6/2021 | Zhang | ................. H04W 74/002 |
| 2021/0378004 A1* | 12/2021 | Cirik | ................. H04W 72/0446 |

(Continued)

FOREIGN PATENT DOCUMENTS

| | | |
|---|---|---|
| EP | 3547745 A1 | 10/2019 |
| WO | 2020/215105 A2 | 10/2020 |
| WO | 2021/159433 A1 | 8/2021 |

(Continued)

OTHER PUBLICATIONS

"3rd Generation Partnership Project; Technical Specification Group Radio Access Network; NR; Physical layer procedures for control (Release 17)", 3GPP TS 38.213, V17.2.0, Jun. 2022, pp. 1-256.

(Continued)

*Primary Examiner* — Nicholas A Jensen
*Assistant Examiner* — Oladiran Gideon Olaleye
(74) *Attorney, Agent, or Firm* — Barta Jones, PLLC

(57) ABSTRACT

Various example embodiments relate to channel measurement and reporting. A user equipment may obtain an association between one or more transmission-reception points and one or more groups of resources for channel measurement. The user equipment may receive, from a network node, an indication indicating muting or unmuting of at least one of the one or more transmission-reception points. The user equipment may determine, based at least partly on the association and the received indication, one or more sets of the resources to be measured.

4 Claims, 6 Drawing Sheets

(56) References Cited

U.S. PATENT DOCUMENTS

| | | | |
|---|---|---|---|
| 2023/0061722 A1* | 3/2023 | Hao | H04B 7/024 |
| 2023/0209556 A1* | 6/2023 | Kang | H04L 5/0048 |
| | | | 370/329 |

FOREIGN PATENT DOCUMENTS

| | | | |
|---|---|---|---|
| WO | WO-2021155585 A1 * | 8/2021 | H04L 5/0057 |
| WO | 2022/015750 A1 | 1/2022 | |
| WO | 2022/067863 A1 | 4/2022 | |
| WO | 2022/077414 A1 | 4/2022 | |
| WO | 2022/077430 A1 | 4/2022 | |
| WO | 2022/155896 A1 | 7/2022 | |

OTHER PUBLICATIONS

"3rd Generation Partnership Project; Technical Specification Group Radio Access Network; NR; Physical layer procedures for data (Release 17)", 3GPP TS 38.214, V17.2.0, Jun. 2022, pp. 1-228.

"3rd Generation Partnership Project; Technical Specification Group Radio Access Network; NR; Medium Access Control (MAC) protocol specification (Release 17)", 3GPP TS 38.321, V17.0.0, Mar. 2022, pp. 1-221.

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"New SI: Study on network energy savings for NR", 3GPP TSG RAN Meeting #94e, RP-213554, Agenda: 8A.1, Huawei, Dec. 6-17, 2021, 5 pages.

"CSI enhancements: MTRP and FR1 FDD reciprocity", 3GPP TSG RAN WG1 #105-e, R1-2104658, Agenda: 8.1.4, Qualcomm Incorporated, May 19-27, 2021, pp. 1-18.

"CSI enhancement for multi-TRP and FDD", 3GPP TSG RAN WG1 Meeting #102-e, R1-2005289, Agenda: 8.1.4, Futurewei, Aug. 17-28, 2020, 5 pages.

"IEEE 802.11", Wikipedia, Retrieved on Aug. 1, 2023, Webpage available at : https://en.wikipedia.org/wiki/IEEE_802.11.

Office action received for corresponding Finnish Patent Application No. 20225721, dated Dec. 16, 2022, 9 pages.

"Summary of CSI enhancements for MTRP and FDD (Round 0)", 3GPP TSG RAN WG1 Meeting #104-e, R1-2101884, Agenda: 8.1.4, Huawei, Jan. 25-Feb. 5, 2021, 48 pages.

"Further discussion on MTRP multibeam enhancement", 3GPP TSG RAN WG1 #105-e, R1-2104345, Agenda: 8.1.2.3, vivo, May 10-27, 2021, 14 pages.

"Discussion Summary #2 for energy saving techniques of NW energy saving SI", 3GPP TSG RAN WG1 Meeting #111, R1-2212565, Agenda: 9.7.2, Intel Corporation, Nov. 2022, 133 pages.

Office action received for corresponding Finnish Patent Application No. 20225721, dated Apr. 20, 2023, 11 pages.

Extended European Search Report received for corresponding European Patent Application No. 23186264.0, dated Jan. 5, 2024, 9 pages.

* cited by examiner

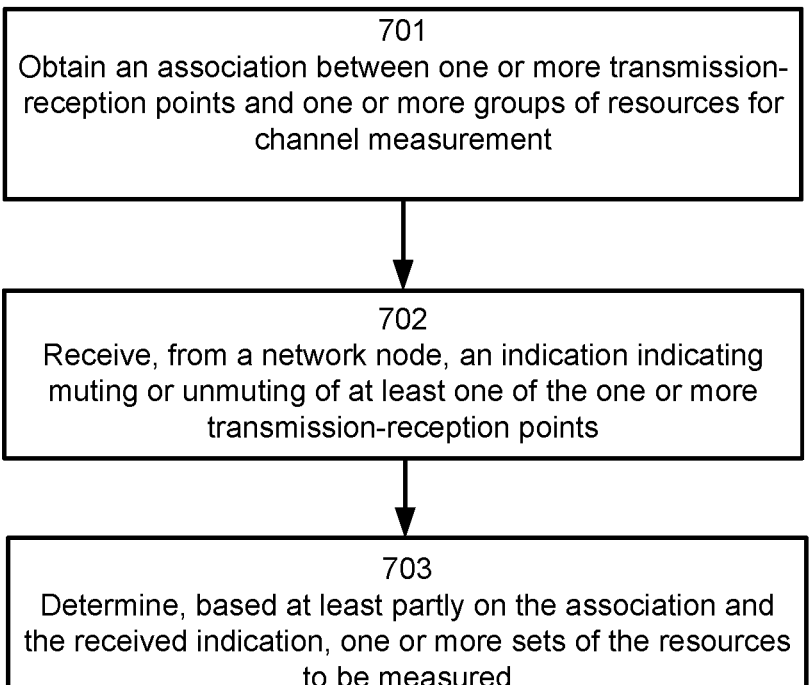

701
Obtain an association between one or more transmission-reception points and one or more groups of resources for channel measurement 702
Receive, from a network node, an indication indicating muting or unmuting of at least one of the one or more transmission-reception points 703
Determine, based at least partly on the association and the received indication, one or more sets of the resources to be measured

FIG. 7

801
Transmit, to a user equipment, an indication indicating muting or unmuting of at least one of one or more transmission-reception points

FIG. 8

CHANNEL MEASUREMENT AND REPORTING FOR MULTI-TRP

TECHNICAL FIELD

Various example embodiments generally relate to the field of wireless communications. Some example embodiments relate to channel measurement and reporting, and in particular CSI (Channel State Information) measurement and reporting for multiple transmission-reception points (TRPs).

BACKGROUND

Wireless communication systems may enable communication with multiple TRPs, for example in order to improve reliability or capacity of uplink transmissions from devices, such as for example user equipment (UE).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Some embodiments provide apparatuses and methods to improve multi-TRP transmission. Some embodiments provide apparatuses and methods to reduce energy consumption in a multi-TRP communication network. This and other benefits may be achieved by the features of the independent claims. Further example embodiments are provided in the dependent claims, the description, and the drawings.

According to some aspects, there is provided the subject matter of the independent claims. Some further aspects are defined in the dependent claims.

According to a first aspect, an apparatus comprises: at least one processor; and at least one memory storing instructions that, when executed by the at least one processor, cause the apparatus at least to perform operations comprising: obtaining an association between one or more transmission-reception points and one or more groups of resources for channel measurement; receiving, from a network node, an indication indicating muting or unmuting of at least one of the one or more transmission-reception points; and determining, based at least partly on the association and the received indication, one or more sets of the resources to be measured.

According to an example embodiment of the first aspect, the indication indicates muting of the at least one of the one or more transmission-reception points, and wherein determining the one or more sets of the resources to be measured comprises: determining that both a first set of resources and a group of the one or more groups of resources for channel measurement comprise at least one same resource, wherein the group of the one or more groups of resources for channel measurement is associated with the at least one of the one or more transmission-reception points; and removing the first set of resources from the one or more sets of the resources to be measured, based on the determining that both the first set of resources and the group of the one or more groups of resources for channel measurement comprise the at least one same resource.

According to an example embodiment of the first aspect, the indication indicates unmuting of the at least one of the one or more transmission-reception points, and wherein determining the one or more sets of the resources to be measured comprises: determining that both a second set of resources and a group of the one or more groups of resources for channel measurement comprise at least one same resource, wherein the group of the one or more groups of resources for channel measurement is associated with the at least one of the one or more transmission-reception points; and including the second set of resources into the one or more sets of the resources to be measured, based on the determining that both the second set of resources and the group of the one or more groups of resources for channel measurement comprise the at least one same resource.

According to an example embodiment of the first aspect, the operations further comprise: performing measurements on the one or more sets of the resources to be measured.

According to an example embodiment of the first aspect, the operations further comprise: sending a report, to the network node, based on the measurements performed on the one or more sets of the resources.

According to an example embodiment of the first aspect, the operations further comprise: erasing one or more measurements for the first set of resources.

According to an example embodiment of the first aspect, the operations further comprising: storing one or more measurements for the first set of resources.

According to an example embodiment of the first aspect, wherein at least one of the one or more sets of resources comprises: one or more resources, wherein the one or more resources corresponds to at least one single transmission-reception point—TRP—transmission configuration; or a set of resource pairs, wherein the set of resource pairs comprises one or more resource pairs, wherein the set of resource pairs corresponds to at least one multi-TRP transmission configuration.

According to an example embodiment of the first aspect, wherein each of the one or more transmission-reception points is identified by an identifier comprising at least one of: a set of Reference Signal—RS—resources, or a Control Resource Set—CORESET—pool index, or a physical cell identifier—PCI—.

According to an example embodiment of the first aspect, wherein obtaining the association comprises receiving the association from the network node.

According to a second aspect, a method comprises: obtaining an association between one or more transmission-reception points and one or more groups of resources for channel measurement; receiving, at a user equipment and from a network node, an indication indicating muting or unmuting of at least one of the one or more transmission-reception points; and determining, based at least partly on the association and the received indication, one or more sets of the resources to be measured.

According to a third aspect, a computer program comprising instructions which, when executed by an apparatus, cause the apparatus to perform at least the following: obtaining an association between one or more transmission-reception points and one or more groups of resources for channel measurement; receiving, from a network node, an indication indicating muting or unmuting of at least one of the one or more transmission-reception points; and determining, based at least partly on the association and the received indication, one or more sets of the resources to be measured.

According to a fourth aspect, an apparatus, comprises: means for obtaining an association between one or more transmission-reception points and one or more groups of resources for channel measurement; means for receiving, from a network node, an indication indicating muting or unmuting of at least one of the one or more transmission-reception points; and means for determining, based at least partly on the association and the received indication, one or more sets of the resources to be measured.

According to a fifth aspect, an apparatus, comprises: at least one processor; and at least one memory storing instructions that, when executed by the at least one processor, cause the apparatus at least to perform operations comprising: transmitting, to a user equipment, an indication indicating muting or unmuting of at least one of one or more transmission-reception points, the one or more transmission-reception points being associated to one or more groups of resources for channel measurement.

According to an example embodiment of the fifth aspect, the operations further comprise: transmitting to the user equipment, an association between the one or more transmission-reception points and the one or more groups of resources for channel measurement.

According to a seventh aspect, a method, comprises: transmitting, at a network node and to a user equipment, an indication indicating muting or unmuting of at least one of one or more transmission-reception points, the one or more transmission-reception points being associated to one or more groups of resources for channel measurement.

According to an eighth aspect, a computer program comprises instructions which, when executed by an apparatus, cause the apparatus to perform at least the following: transmitting, to a user equipment, an indication indicating muting or unmuting of at least one of one or more transmission-reception points, the one or more transmission-reception points being associated to one or more groups of resources for channel measurement.

According to a ninth aspect, an apparatus comprises: means for transmitting, to a user equipment, an indication indicating muting or unmuting of at least one of one or more transmission-reception points, the one or more transmission-reception points being associated to one or more groups of resources for channel measurement.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 7 illustrates an example embodiment of a method according to the subject matter described herein.

FIG. 8 illustrates an example embodiment of a method according to the subject matter described herein.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In order to improve reliability, latency and/or capacity of uplink channel, a device may be configured to communicate with multiple TRPs. For example, different transmissions may be transmitted towards different TRPs. Similarly, signals may be received from different TRPs. This enables to increase the multiplexing capability and, more generally, to increase transmission resource efficiency and also to achieve lower latency.

To reduce energy consumption of the communication network, it may be beneficial to dynamically mute one or more TRPs. Dynamically muting a TRP may have an impact and/or implications on channel measurements and reporting to be performed by the UE.

Some embodiments enable single-TRP and multi-TRP hypotheses related measurements and reporting in a dynamic TRP muting/unmuting scheme. Some embodiments define UE behaviour in view of the dynamic muting/unmuting of TRPs.

According to an example embodiment, an apparatus, for example UE, may obtain an association between one or more transmission-reception points and one or more groups of resources for channel measurement; receive, from a network node, an indication indicating muting or unmuting of at least one of the one or more transmission-reception points; and determine, based at least partly on the association and the received indication, one or more sets of the resources to be measured.

Figure 1:
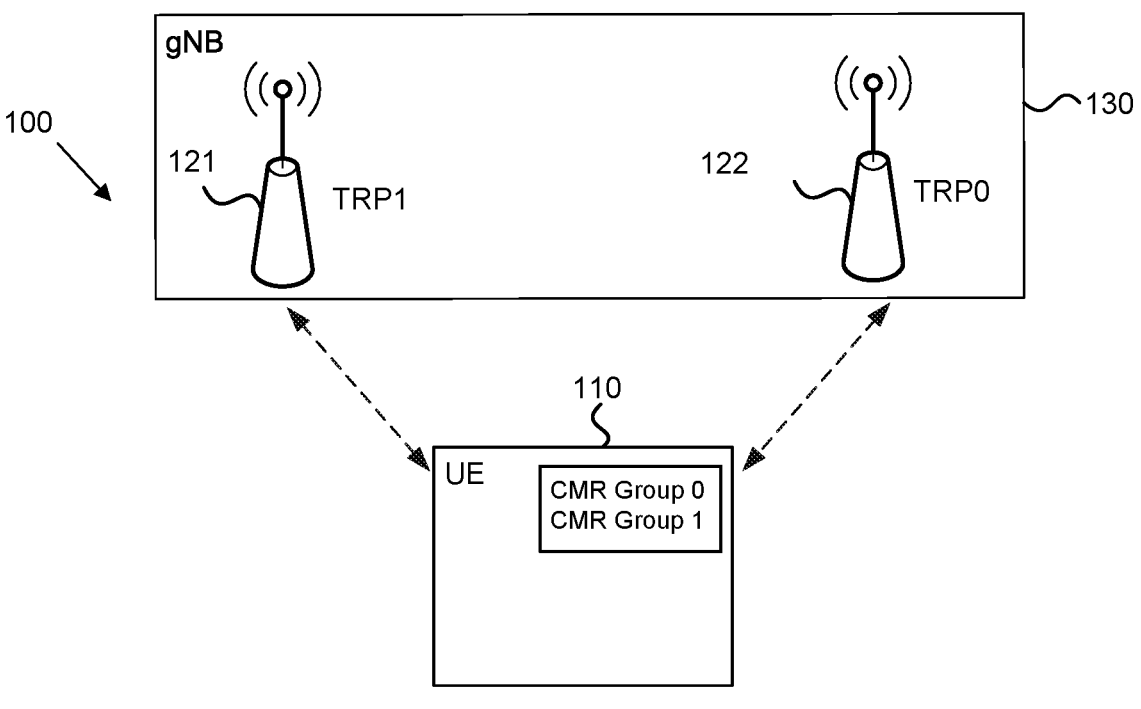
FIG. 1 illustrates an example embodiment of a communication network.

FIG. 1 illustrates an example of a communication network. Communication network 100 may comprise one or more apparatuses, which may be also referred to as client nodes, user nodes, or UE, an example of which is provided as UE 110. UE 110 may communicate with one or more access point (gNB) 130. gNB 130 may comprise multiple TRPs. In this example, gNB 130 comprises first and second TRPs 121, 122. UE 110 may in general communicate with any number (M) of TRPs. Communications between UE 110 and TRPs 121, 122 may be bidirectional and hence any of these entities may be configured to operate as a transmitter and/or a receiver.

A TRP may be identified or represented (or replaced) by a TRP identifier. A TRP identifier may comprise one or more of: a set of RS resources, such as a set of CSI-RS resources, a Control Resource Set (CORESET) pool index (CORESETPoolIndex), a physical cell identifier (PCI), or a TRP ID.

In various channel measurement and reporting schemes, such as CSI measurement and reporting, UE 110 may be configured with transmission resources for channel measurement, hereinafter called channel measurement resources (CMRs). A CMR may be a Reference Signal (RS) resource, such as CSI-RS resource. UE 110 measures RSs corresponding to some or all of the CMR sets.

Each CMR may correspond to or be associated with a CMR group. Each CMR group may correspond to or be associated with a specific TRP. In particular, a CMR group may correspond to a specific TRP in the sense that the CMRs of the CMR group are configured to be received from the specific TRP. An association is defined or configured between each CMR group and a respective TRP. In the example embodiment of FIG. 1, UE 110 is configured with CMR group 0, and CMR group 1. TRP0 is associated with CMR group 0, and TRP1 is associated with CMR group 1.

UE 110 may be configured with one or more CMR sets, and/or determine one or more CMR sets. A CMR set may be a set of CMRs or a set of CMR pairs. Each CMR or CMR pair corresponds to a transmission configuration hypothesis. A set of CMRs may comprise one or more CMRs. A CMR may correspond to a single-TRP transmission configuration hypothesis. A set of CMR pairs may comprise one or more CMR pairs. A CMR pair may correspond to a multi-TRP transmission configuration hypothesis, including NCJT (non-coherent joint transmission) configurations, or CJT (coherent joint transmission) configurations. A CMR pair may comprise one CMR from each CMR group. In other words, a CMR pair may comprise one CMR for each TRP. For multi-TRP transmission configuration hypothesis, UE may determine a CMR pair by pairing one CMR from each CMR group.

To reduce energy consumption of the communication network, one or more TRPs may be dynamically muted. Muting a TRP may comprise turning off, limiting, or stopping some or all operations at the TRP, partially or completely disactivating, or disconnecting the TRP for a period of time. The muting/unmuting of the TRP may be determined and/or controlled by the gNB 130 in order to reduce or optimize the energy consumption of the network. Alternatively, or additionally, the muting/unmuting of a TRP may be determined at least partially by the UE 110. In a configuration with multiple TRPs, some or all of the TRPs may be subjected to dynamical muting. A muted TRP may or may not still send some transmissions. In particular, a muted TRP may still occasionally send some RSs that may be used to determine whether the TRP should be unmuted.

UE 110 may adjust channel measurement and/or reporting to the dynamical muting/unmuting of the TRPs. Example method embodiments for adjusting channel measurement and/or reporting in response to the muting of one or more TRPs are described in relation to FIGS. 3 to 5. Example method embodiments based on CMR group association are described in relation to FIGS. 3 and 4. Example method embodiments based on restriction on CMR indicators, e.g., (CSI-RS resource indicators (CRIs)) are described in relation to FIG. 5. Example method embodiments based on direct indication of CMR sets or hypotheses are described in relation to FIG. 6.

Communication network 100 may further comprise one or more core network elements (not shown), for example network nodes, network devices, or network functions. The core network may for example comprise an access and mobility management function (AMF) and/or user plane function (UPF), which enable TRPs 121, 122 to provide various communication services for UE 110. The TRPs 121,

122 may be configured to communicate with the core network elements over a communication interface, such as for example a control plane interface and/or a user plane interface (e.g., NG-C/U). An access node, such as TRP 121, may be also called a base station or a radio access network (RAN) node and it may be part of a RAN between the core network and the UE 110. Functionality of an access node, such as a 5th generation (5G) gNB. may be distributed between a central unit (CU), for example a gNB-CU, and one or more distributed units (DU), for example gNB-DUs. It is therefore appreciated that access node functionality described herein may be implemented at a gNB, or divided between a gNB-CU and a gNB. Network elements such gNB, gNB-CU, and gNB-DU may be generally referred to as network nodes or network devices. Although depicted as a single device, a network node may not be a stand-alone device, but for example a distributed computing system coupled to a remote radio head. For example, a cloud radio access network (cRAN) may be applied to split control of wireless functions to optimize performance and cost.

Communication network 100 may be configured for example in accordance with the 5G digital cellular communication network, as defined by the 3rd Generation Partnership Project (3GPP). In one example, the communication network 100 may operate according to 3GPP 5G NR (New Radio). It is however appreciated that example embodiments presented herein are not limited to this example network and may be applied in any present or future wireless communication networks, or combinations thereof, for example other type of cellular networks, short-range wireless networks, broadcast or multicast networks, or the like.

Data communication in communication network 100 may be based on a protocol stack comprising various communication protocols and layers. Layers of the protocol stack may be configured to provide certain functionalities, for example based on the Open Systems Interconnection (OSI) model or a layer model of a particular standard, such as for example NR.

In one example, the protocol stack may comprise a service data adaptation protocol (SDAP) layer, which may, at the transmitter side, receive data from an application layer for transmission, for example one or more data packets. The SDAP layer may be configured to exchange data with a PDCP (packet data convergence protocol) layer. The PDCP layer may be responsible of generation of PDCP data packets, for example based on data obtained from the SDAP layer.

A radio resource control (RRC) layer, provided for example on top of the PDCP layer, may be configured to implement control plane functionality. RRC may refer to provision of radio resource related control data. RRC messages may be transmitted on various logical control channels such as for example a common control channel (CCCH) or a dedicated control channel (DCCH).

The PDCP layer may provide data to one or more instances of a radio link control (RLC) layer. For example, the PDCP data packets may be transmitted on one or more RLC transmission legs. RLC instance(s) may be associated with corresponding medium access control (MAC) instances of the MAC layer. The MAC layer may deliver the data to the physical layer for transmission.

The MAC layer may provide a mapping between logical channels of the upper layer(s) and transport channels, such as for example broadcast channel (BCH), paging channel (PCH), downlink shared channel (DL-SCH), uplink shared channel (UL-SCH), or random access channel (RACH). The MAC layer may be further configured to handle multiplexing and demultiplexing of MAC service data units (SDU). Furthermore, the MAC layer may provide error correction functionality based on packet retransmissions, for example according to the hybrid automatic repeat request (HARQ) process. The MAC layer may also carry control information, for example in MAC control elements (CE). This enables fast exchange of control information at the MAC layer without involving the upper layers.

The physical layer may provide data transmission services on physical layer channels such as for example the physical broadcast channel (PBCH), physical downlink control channel (PDCCH), physical downlink shared channel (PDSCH), physical uplink control channel (PUCCH), physical uplink shared channel (PUSCH), or physical random access channel (PRACH). The physical layer may for example perform modulation, forward error correction (FEC) coding, define a physical layer frame structure, etc., to transmit upper layer data at the physical channels. The physical channels may carry the transport channels. The physical layer may also carry signalling information, for example downlink control information (DCI). DCI may therefore comprise physical layer signalling information. DCI may be carried for example on PDCCH. DCI may include information about uplink resource allocation and/or information about downlink transmissions targeted to UE 110. DCI may be used by TRPs 121, 122 for example to schedule an uplink grant for UE 110, i.e., to inform UE 110 about transmission resources (e.g. subcarriers of particular orthogonal frequency division multiplexing (OFDM) symbols) assigned to UE 110 for uplink transmission. DCI may further indicate transmission parameters to be used for the uplink grant.

Transmission resources of the physical layer may comprise time and/or frequency resources. An example of a frequency resource is a subcarrier of an orthogonal frequency division multiplexing (OFDM) symbol. An example of a time resource is the OFDM symbol. A resource element (RE) may for example comprise one subcarrier position during one OFDM symbol. A resource element may be configured to carry one modulation symbol, for example a quadrature amplitude modulation (QAM) symbol comprising a real and/or an imaginary parts of the modulation symbol. Transmission resources may be assigned in blocks of resource elements. A resource block may comprise a group of resource elements (e.g. 12 REs).

The protocol stack may therefore comprise the following layers (lowest to highest): physical layer, MAC layer, RLC layer, and PDCP layer. RRC and SDAP protocols may be configured to operate on top of the PDCP layer. Corresponding protocol stacks may be applied at the UE 110 and TRPs 121, 122. Even though various operations have been described using the above protocol stack as an example, it is appreciated that the described example embodiments may be also applied to other protocol stacks having sufficiently similar functionality.

Figure 2:
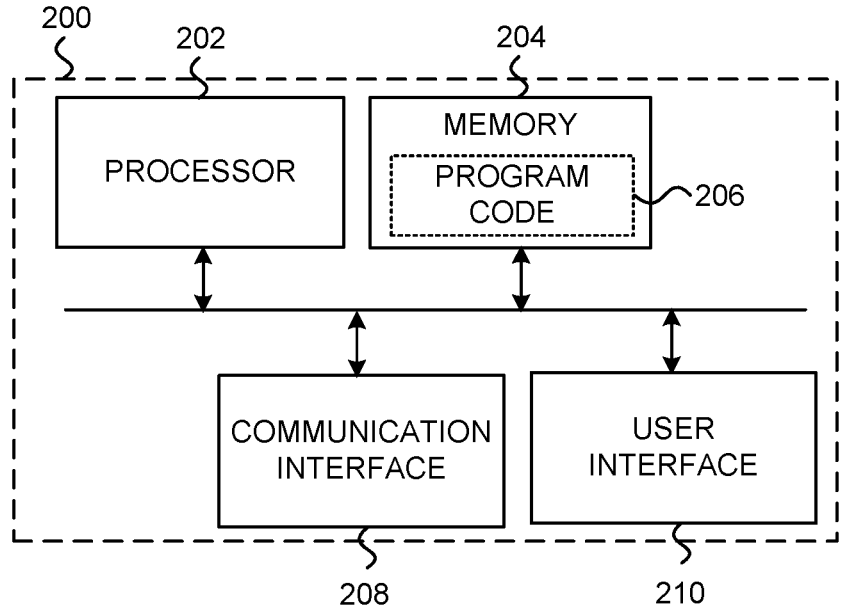
FIG. 2 illustrates an example embodiment of an apparatus configured to practice one or more example embodiments.

FIG. 2 illustrates an example embodiment of an apparatus 200, for example UE 110, TRPs 121, 122, or a component or a chipset of UE 110 or TRPs 121, 122. Apparatus 200 may comprise at least one processor 202. The at least one processor 202 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Apparatus 200 may further comprise at least one memory 204. The at least one memory 204 may be configured to store, for example, computer program code or the like, for example operating system software and application software. The at least one memory 204 may comprise one or more volatile memory devices, one or more non-volatile memory devices, and/or a combination thereof. For example, the at least one memory 204 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 200 may further comprise a communication interface 208 configured to enable apparatus 200 to transmit and/or receive information to/from other devices. In one example, apparatus 200 may use communication interface 208 to transmit or receive signalling information and/or data in accordance with at least one cellular communication protocol. Communication interface 208 may be configured to provide at least one wireless radio connection, such as for example a 3GPP mobile broadband connection (e.g. 3G, 4G, 5G, 6G). However, the communication interface may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a wired connection such as for example a local area network (LAN) connection, a universal serial bus (USB) connection or an optical network connection, or the like; or a wired Internet connection. Communication interface may therefore comprise various means for transmitting and/or receiving radio signals, for example analog and/or digital circuitry such as for example baseband circuitry and/or radio frequency (RF) circuitry. Communication interface 208 may further comprise, or be configured to be coupled to, an antenna or a plurality of antennas to transmit and/or receive radio signals. One or more of the various types of connections may be also implemented as separate communication interfaces, which may be coupled or configured to be coupled to an antenna or a plurality of antennas.

Apparatus 200 may further comprise a user interface 210 comprising an input device and/or an output device. The input device may take various forms such a keyboard, a touch screen, or one or more embedded control buttons. The output device may for example comprise a display, a speaker, a vibration motor, or the like.

When apparatus 200 is configured to implement some functionality of the example embodiments, some component and/or components of apparatus 200, such as for example the at least one processor 202 and/or the at least one memory 204, may be configured to implement this functionality. Furthermore, when the at least one processor 202 is configured to implement some functionality, this functionality may be implemented using program code 206 comprised, for example, in the at least one memory 204.

The functionality described herein may be performed, at least in part, by one or more computer program product components such as for example software components. According to an embodiment, the apparatus comprises a processor or processor circuitry, such as for example a microcontroller, configured by the program code when executed to execute the embodiments of the operations and functionality described. A computer program or a computer program product may therefore comprise instructions for causing, when executed, apparatus 200 to perform the method(s) described herein. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

Apparatus 200 comprises means for performing at least one method described herein. In one example, the means comprises the at least one processor 202, the at least one memory 204 including program code 206 configured to, when executed by the at least one processor, cause the apparatus 200 to perform the method. Apparatus 200 may for example comprise means for generating, transmitting, and/or receiving wireless communication signals, for example modulation circuitry, demodulation circuitry, radio frequency (RF) circuitry, or the like. The circuitry(ies) may be coupled to, or configured to be coupled to, one or more antennas to transmit and/or receive the wireless communication signals over an air interface.

Apparatus 200 may comprise a computing device such as for example a gNB, a base station, a mobile phone, a smartphone, a tablet computer, a laptop, an internet of things (IoT) device, or the like. Examples of IoT devices include, but are not limited to, consumer electronics, wearables, sensors, and smart home appliances. In one example, apparatus 200 may comprise a vehicle such as for example a car. Although apparatus 200 is illustrated as a single device it is appreciated that, wherever applicable, functions of apparatus 200 may be distributed to a plurality of devices, for example to implement example embodiments as a cloud computing service.

Figure 3:
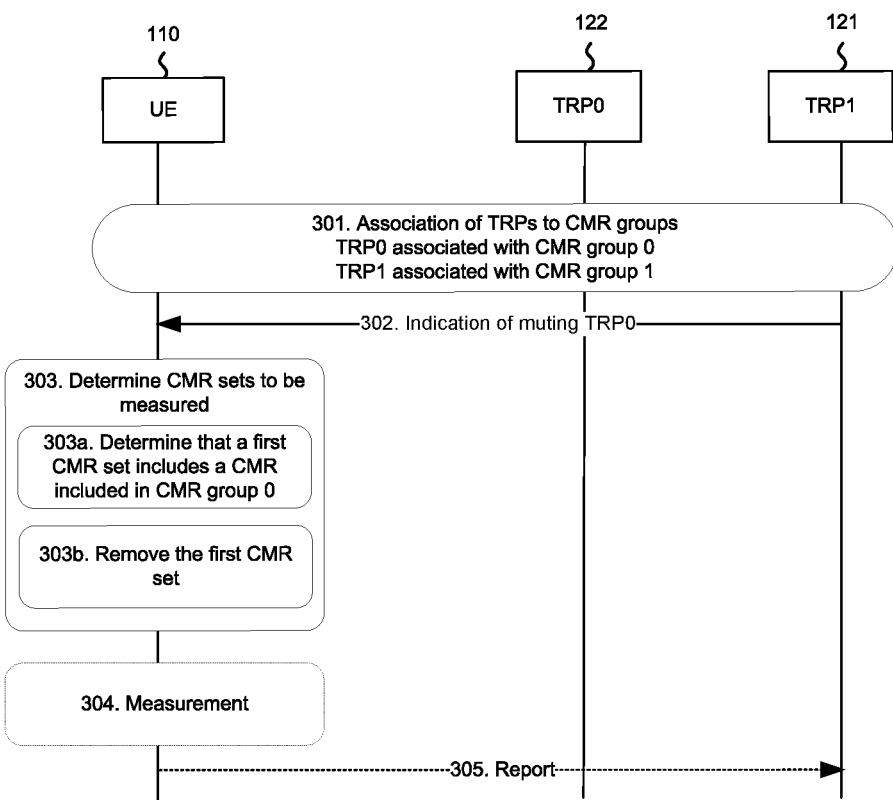
FIG. 3 illustrates an example embodiment of a method for adjusting channel measurement and/or reporting in response to the muting of one or more TRPs.

FIG. 3 illustrates an example embodiment for adjusting channel measurement and/or reporting in response to the muting of one or more TRPs. The method of FIG. 3 is based on CMR group association.

The method may be used for CSI measurement and reporting. Apparatuses, such as UE 110, TRP 121, and TRP 122, may be configured to perform the functionalities and operations of the method of FIG. 3. It is noted that FIG. 3 presents one example of operations at UE 110, TRP 121, and TRP 122. Some of the described operations may not be present in all example embodiments and the example embodiments may also comprise additional features/operations described elsewhere in this specification.

Prior to operation 301, UE 110 is configured with CMRs. Each CMR may be associated with a CMR group. Each CMR group may correspond to or be associated with a specific TRP. An association is defined or configured between each CMR group and a respective TRP. For example, UE 110 is configured with CMR group 0, and CMR group 1. TRP0 is associated with CMR group 0, and TRP1 is associated with CMR group 1.

UE 110 may be configured with one or more CMR sets, and/or determine one or more CMR sets. A CMR set may be a set of CMRs or a set of CMR pairs. Each CMR or CMR pair corresponds to a transmission configuration hypothesis. A set of CMRs may comprise one or more CMRs. A CMR may correspond to a single-TRP transmission configuration hypothesis. A set of CMR pairs may comprise one or more CMR pairs. A CMR pair may correspond to a multi-TRP transmission configuration hypothesis. A CMR pair may comprise one CMR from each CMR group. In other words, a CMR pair may comprise one CMR for each TRP. For multi-TRP transmission configuration hypothesis, UE may determine a CMR pair by pairing one CMR from each CMR group.

At operation 301, UE 110 obtains the association between one or more CMR groups and one or more TRPs. UE 110 may receive the association from gNB 130. The association may alternatively be default and/or previously agreed between gNB 130 and UE 110. For example, UE 110 receives an indication that TRP0 is associated with CMR group 0, and that TRP1 is associated with CMR group 1. In the association, each TRP may be identified by an identifier. The identifier may be a set of RS resources, such as a set of CSI-RS resources, a set of reference signals, a CORESET pool index (CORESETPoolIndex), a physical cell identifier (PCI), or a TRP ID. UE 110 is configured with the association between the one or more CMR groups and the one or more TRPs.

At operation 302, UE 110 receives, from gNB 130, an indication indicating muting of at least one TRP. In the example of FIG. 3, UE 110 receives an indication that TRP0 122 is muted. The indication may be received via DCI or MAC Control Element (CE). The indication may include the identifier of the muted TRP. In particular, the indication may be received through muting the CORESETPoolIndex corresponding to the muted TRP, or at least one RS resource set dedicated to the muted TRP.

At operation 303, UE 110 determines one or more of the CMR sets to be measured, e.g., for CSI reporting. The CMR sets to be measured do not include any CMR set that includes at least one CMR of any CMR group associated with the muted TRP.

The CMR sets to be measured are determined based at least partly on the association and the received indication. When determining the CMR sets to be measured, UE 110 may remove or discard any CMR set that comprises or corresponds to at least one CMR of the CMR group associated with the muted TRP.

In particular, UE 110 may determine, at operation 303*a*, that both a first CMR set and a CMR group associated with the muted TRP comprise at least one same CMR. In that case, UE 110 may remove, at operation 303*b*, the first CMR set from the CMR sets to be measured.

Removing or discarding a CMR set may comprise temporally disabling or deactivating the CMR set for a period of time or until further notice. In other words, UE 110 may treat any hypothesis that corresponds to at least one CMR of the CMR group associated with the muted TRP as a discarded, disabled or inactive hypothesis.

Additionally, UE 110 may remove or discard any reference signal resource for interference measurement (such as CSI-RS for interference measurement) associated with or corresponding to a removed or discarded CMR set or the muted TRP.

In the example of FIG. 3, UE 110 removes the CMR sets that include at least one CMR of CMR group 0.

At operation 304, UE 110 may perform measurements for each of the CMR sets determined at operation 303. In particular, UE 110 may measure one or more RSs for each CMR set determined at operation 303. UE 110 may measure a signal quality for each RS, for example a RSRP (Reference Signal Received Power). In some embodiments, UE does not measure any of the removed, discarded, disabled, or inactive CMR sets.

At operation 305, UE 110 may transmit a report to gNB 130. The report may be a CSI report. The report may be based on the measurements performed at operation 304. In some embodiments, UE does not report on any of the removed, discarded, disabled, or inactive CMR sets.

Figure 4:
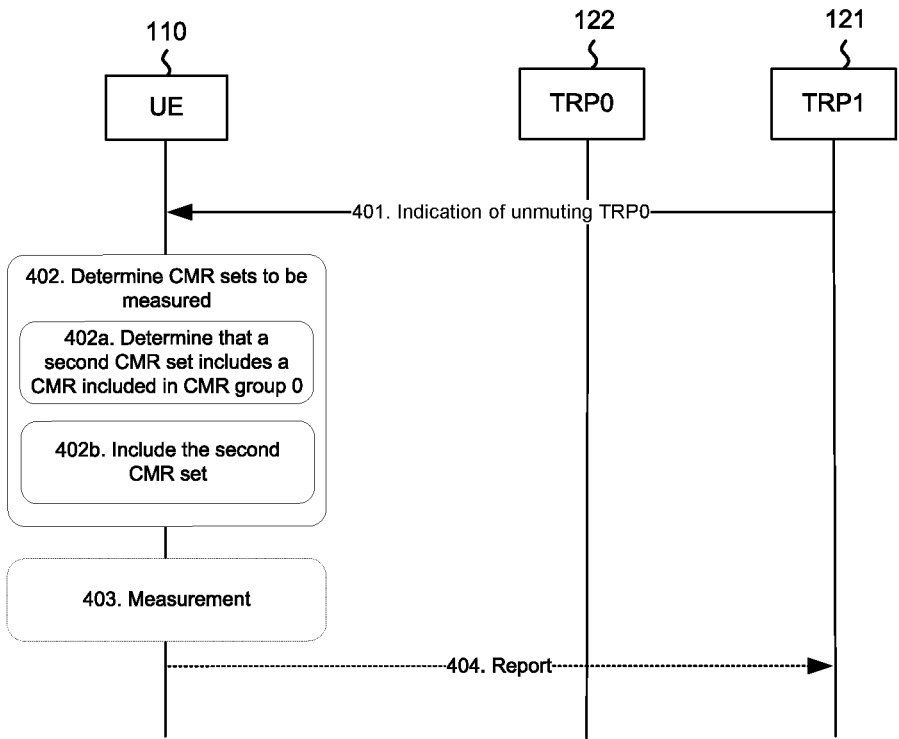
FIG. 4 illustrates an example embodiment of a method for adjusting channel measurement and/or reporting in response to the unmuting of one or more TRPs.

FIG. 4 illustrates an example embodiment for adjusting channel measurement and/or reporting in response to the unmuting of one or more TRPs. The method of FIG. 4 is based on CMR group association.

The method may be used for CSI measurement and reporting. Apparatuses, such as UE 110, TRP 121, and TRP 122, may be configured to perform the functionalities and operations of the method of FIG. 4. It is noted that FIG. 4 presents one example of operations at UE 110, TRP 121, and TRP 122. Some of the described operations may not be present in all example embodiments and the example embodiments may also comprise additional features/operations described elsewhere in this specification.

Prior to operation 401, at least one of the TRPs may have been muted. In the example of FIG. 3, TRP0 has been muted. As a result, UE 110 may have removed, discarded, disabled, or deactivated any CMR group associated with the muted TRP. In the example of FIG. 3, UE 110 has discarded any CMR set that includes at least one CMR of CMR group 0.

At operation 401, UE 110 receives, from gNB 130, an indication unmuting of at least one TRP. For example, UE 110 may receive an indication that TRP0 122 is unmuted. The indication may be received via DCI or MAC Control Element (CE). The indication may include the identifier of the unmuted TRP. In particular, the indication may be received through unmuting the CORESETPoolIndex corresponding to the unmuted TRP, or at least one RS resource set dedicated to the unmuted TRP.

At operation 402, UE 110 determines one or more of the CMR sets to be measured, e.g., for CSI reporting. The CMR sets to be measured may include any CMR set that includes at least one CMR of any CMR group associated with the unmuted TRP.

The CMR sets to be measured are determined based at least partly on the association and the received indication.

When determining the CMR sets to be measured, UE 110 may include any CMR set that comprises or corresponds to at least one CMR of the CMR group associated with the muted TRP.

In particular, UE 110 may determine, at operation 402a, that both a second CMR set and a CMR group associated with the unmuted TRP comprise at least one same CMR. In that case, UE 110 may include, at operation 402b, the second CMR set from the CMR sets to be measured.

Including a CMR set may comprise enabling or activating the CMR set for a period of time or until further notice. In other words, UE 110 may treat any hypothesis that corresponds to at least one CMR of the CMR group associated with the unmuted TRP as an included, enabled or active hypothesis.

Additionally, UE 110 may include or reconsider any reference signal resource for interference measurement (such as CSI-RS for interference measurement) associated with or corresponding to an included CMR set or the unmuted TRP.

In the example of FIG. 4, UE 110 includes any CMR set that includes at least one CMR of CMR group 0.

At operation 403, UE 110 may perform measurements for each of the CMR sets determined at operation 402. In particular, UE 110 may measure one or more RSs for each CMR set determined at operation 402. UE 110 may measure a signal quality for each RS, for example a RSRP (Reference Signal Received Power). In some embodiments, UE measures all the included, enabled, or active CMR sets.

At operation 404, UE 110 may transmit a report to gNB 130. The report may be a CSI report. The report may be based on the measurements performed at operation 403. In some embodiments, UE reports on all the included, enabled, or active CMR sets.

One or more CMR set may be configured (e.g., via RRC) in such a way that, when the CMR set is removed, discarded, disabled or inactive due to TRP muting, the UE may erase the measurements for the CMR set. Erasing the measurements may include discarding the measurements from a memory.

One or more CMR set may be configured (e.g., via RRC) in such a way that, when the CMR set is removed, discarded, disabled or inactive due to TRP muting, the UE may store the measurements for the CMR set. Storing the measurements may include keeping the measurements in a memory.

Although embodiments described above focus on CMR groups, the same approach may be used for part of a CMR group, e.g., for a subset of CMR within a CMR group.

Each CMR set may correspond to one or more transmission configuration hypotheses. The one or more hypotheses may comprise one or more single-TRP hypotheses and/or one or more multi-TRP hypotheses. A multi-TRP hypothesis may be a NCJT or a CJT hypothesis.

Figure 5:
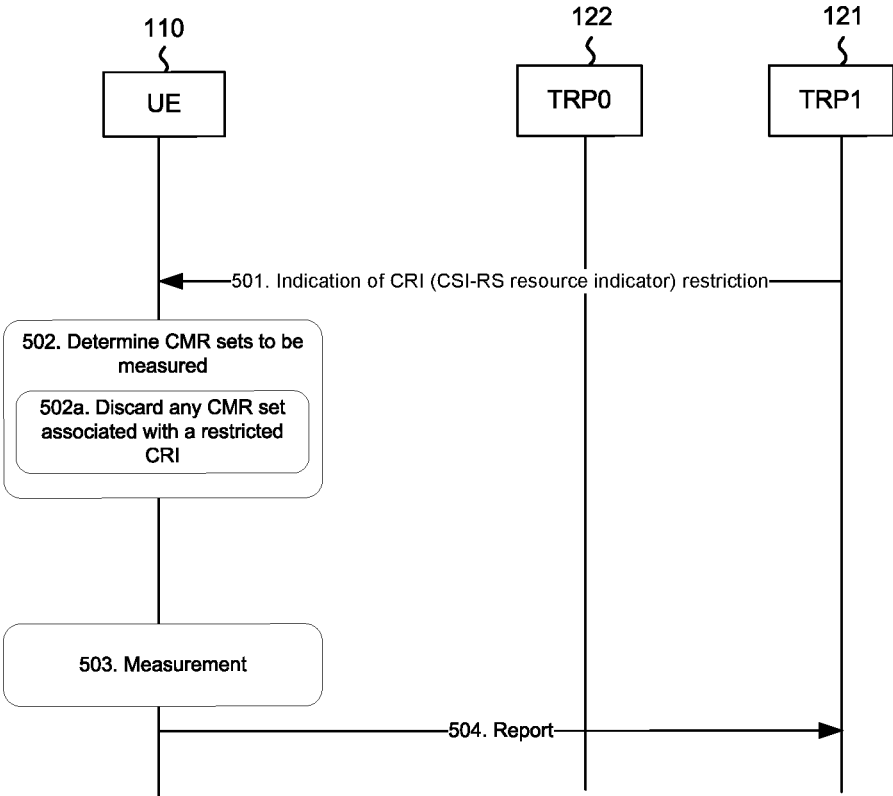
FIG. 5 illustrates an example embodiment of a method for adjusting channel measurement and/or reporting in response to the muting/unmuting of one or more TRPs.

FIG. 5 illustrates an example embodiment for adjusting channel measurement and/or reporting in response to the muting or unmuting of one or more TRPs. The method of FIG. 5 is based on restriction on CMR indicators, e.g., (CSI-RS resource indicators (CRIs)).

The method may be used for CSI measurement and reporting. Apparatuses, such as UE 110, TRP 121, and TRP 122, may be configured to perform the functionalities and operations of the method of FIG. 5. It is noted that FIG. 5 presents one example of operations at UE 110, TRP 121, and TRP 122. Some of the described operations may not be present in all example embodiments and the example embodiments may also comprise additional features/operations described elsewhere in this specification.

Prior to operation 501, UE 110 is configured with CMRs.

Each CMR may be identified by or be associated with a CMR indicator. For example, if the CMR is a CSI-RS resource the CMR indicator may be a CSI-RS resource indicator (CRI).

Each CMR may be associated with a CMR group. Each CMR group may correspond to or be associated with a specific TRP. An association is defined or configured between each CMR group and a respective TRP. For example, UE 110 is configured with CMR group 0, and CMR group 1. TRP0 is associated with CMR group 0, and TRP1 is associated with CMR group 1.

UE 110 may be configured with one or more CMR sets and/or determine one or more CMR sets. A CMR set may be a set of CMRs or a set of CMR pairs.

At operation 501, UE is configured with one or more CRI restrictions. UE 110 may receive, from gNB 130, an indication relative to CRI restrictions, e.g., via DCI or MAC CE. The indication may identify one or more restricted CRIs. The one or more restricted CRIs corresponds to one or more CMRs associated with a muted TRP. For example, TRP0 122 may be muted. In this example, the one or more restricted CRIs identify CMRs corresponding to TRP0 122. The one or more restricted CRIs may correspond to a CMR group. In this example, the one or more restricted CRIs correspond to CMR group 0.

The CRI restriction may be defined using a bitmap where each bit in the bitmap may represent at least one CMR. Bit value 0 and bit value 1 may correspond to at least one CMR being restricted or not restricted, respectively. This bitmap may be indicated via DCI or MAC CE.

Alternatively, UE 110 may be configured (e.g., via RRC) with one or more CMR groups. In this case, the one or more restricted CRIs may correspond to a CMR group. The indication relative to CRI restriction may include an indication of at least one CMR group to be restricted (or unrestricted). This indication may be carried in DCI or MAC CE, using new or existing/reserved bits or fields.

At operation 502, UE 110 determines one or more of the CMR sets to be measured, e.g., for CSI reporting. The CMR sets to be measured do not include any CMR set that includes at least one CMR corresponding to a restricted CRI.

When determining the CMR sets to be measured, UE 110 may remove or discard any CMR set that comprises or corresponds to at least one CMR identified by a restricted CRI. Removing or discarding a CMR set may comprise temporally disabling or deactivating the CMR set for a period of time or until further notice. In other words, UE 110 may treat any hypothesis that corresponds to at least one restricted CRI as a removed, discarded, disabled or inactive hypothesis.

At operation 502a, UE 110 may determine the CMR sets to be measured by removing, discarding, disabling, or deactivating any CMR set that comprises at least one CMR identified by a restricted CRI. If the CRI restriction indicates at least one CMR group to be restricted, UE may remove, discard, disable, or deactivate any CMR set that comprises at least one CMR corresponding to a restricted CMR group. In this example, UE 110 discards the CMR sets that include at least one CMR of CMR group 0.

At operation 503, UE 110 may perform measurements for each of the CMR sets determined at operation 502. In particular, UE 110 may measure one or more RSs for each CMR set determined at operation 303. UE 110 may measure a signal quality for each RS, for example a RSRP (Reference Signal Received Power). In some embodiments, UE does not measure any of the discarded, disabled, or inactive CMR sets.

At operation 504, UE 110 may transmit a report to gNB 130. The report may be a CSI report. The report may be based on the measurements performed at operation 503. In some embodiments, UE does not report on any of the discarded, disabled, or inactive CMR sets.

Figure 6:
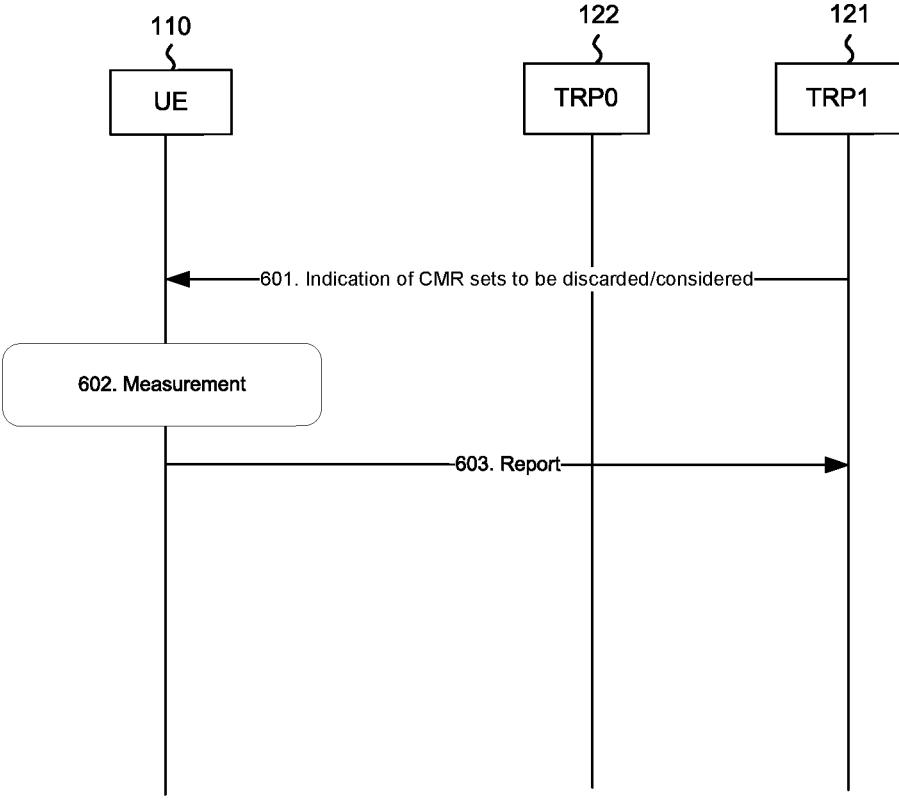
FIG. 6 illustrates an example embodiment of a method for adjusting channel measurement and/or reporting in response to the muting/unmuting of one or more TRPs.

FIG. 6 illustrates an example embodiment for adjusting channel measurement and/or reporting in response to the muting of one or more TRPs. The method of FIG. 6 is based on direct indication of CMR sets to be discarded or considered. In other words, the method of FIG. 6 is based on direct indication of hypotheses to be discarded or considered.

The method may be used for CSI measurement and reporting. Apparatuses, such as UE 110, TRP 121, and TRP 122, may be configured to perform the functionalities and operations of the method of FIG. 6. It is noted that FIG. 6 presents one example of operations at UE 110, TRP 121, and TRP 122. Some of the described operations may not be present in all example embodiments and the example embodiments may also comprise additional features/operations described elsewhere in this specification.

Prior to operation 601, UE 110 is configured with CMRs. UE 110 may be configured with one or more CMR sets, and/or determine one or more CMR sets. A CMR set may be a set of CMRs or a set of CMR pairs.

The CMR sets may be grouped in different groups of CMR sets. Each group of CMR sets may be associated with one or more TRPs. For example, a first group of CMR sets is associated with TRP0, a second group of CMR sets is associated with TRP1, a third group of CMR sets is associated with TRP0 and TRP1.

In other words, the hypotheses may be grouped in different groups of hypotheses. Each group of hypotheses may be associated with one or more TRPs. For example, a first group of hypotheses is associated with TRP0, a second group of hypotheses is associated with TRP1, a third group of hypotheses is associated with TRP0 and TRP1. The first group of hypotheses comprise single-TRP hypotheses associated with TRP0, the second group of hypotheses comprise single-TRP hypotheses associated with TRP1, the third group of hypotheses comprise multi-TRP hypotheses associated with TRP0 and TRP1.

At operation 601, UE may receive, from gNB 130, e.g., via DCI or MAC CE, an indication relative to one or more CMR sets or hypotheses to be discarded. The CMR sets or hypotheses to be discarded corresponds to a muted TRP. For example, TRP0 122 may be muted. In this example, the CMR sets or hypotheses to be discarded include the first group of hypotheses comprising single-TRP hypotheses associated with TRP0, and the third group of hypotheses comprising multi-TRP hypotheses associated with TRP0 and TRP1.

Alternatively, UE may receive, from gNB 130, e.g., via DCI or MAC CE, an indication relative to one or more CMR sets or hypotheses to be measured or considered. The CMR sets or hypotheses to be measured or considered correspond to an unmuted TRP. For example, TRP0 122 may be unmuted. In this example, the CMR sets or hypotheses to be measured or considered include the first group of hypotheses comprising single-TRP hypotheses associated with TRP0, and the third group of hypotheses comprising multi-TRP hypotheses associated with TRP0 and TRP1.

At operation 602, UE 110 may perform measurements for each of the CMR sets determined at operation 601. In particular, UE 110 may measure one or more RSs for each CMR set determined at operation 601. UE 110 may measure a signal quality for each RS, for example a RSRP (Reference Signal Received Power). In some embodiments, UE does not measure any of the discarded, disabled, or inactive CMR sets or hypotheses.

At operation 603, UE 110 may transmit a report to gNB 130. The report may be a CSI report. The report may be based on the measurements performed at operation 602. In some embodiments, UE does not report on any of the discarded, disabled, or inactive CMR sets or hypotheses.

FIG. 7 illustrates an example embodiment of a method.

At 701, the method may comprise obtaining an association between one or more transmission-reception points and one or more groups of resources for channel measurement.

At 702, the method may comprise receiving, from a network node, an indication indicating muting or unmuting of at least one of the one or more transmission-reception points.

At 703, the method may comprise determining, based at least partly on the association and the received indication, one or more sets of the resources to be measured.

FIG. 8 illustrates an example embodiment of a method.

At 801, the method may comprise transmitting, to a user equipment, an indication indicating muting or unmuting of at least one of one or more transmission-reception points, the one or more transmission-reception points being associated to one or more groups of resources for channel measurement.

Further features of the methods directly result from the functionalities and parameters of the UE 110, TRPs 121, 122, or in general apparatus 200, as described in the appended claims and throughout the specification and are therefore not repeated here. Different variations of the methods may be also applied, as described in connection with the various example embodiments.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. A user equipment, comprising:

at least one processor; and at least one memory storing instructions that, when executed by the at least one processor, cause the user equipment at least to perform operations comprising:

obtaining, from a network node via Radio Resource Control (RRC) signaling, an association between one or more transmission-reception points (TRPs) and one or more groups of Channel State Information-Reference Signal (CSI-RS) resources for channel measurement, wherein the association comprises:

(i) for each of the one or more TRPs, an identifier comprising at least one of a Control Resource Set (CORESET) pool index or a physical cell identifier (PCI), and (ii) a measurement handling configuration, received via RRC signaling, that explicitly configures the user equipment to either erase or retain previously performed measurements for CSI-RS resources associated with a muted TRP;

receiving, from the network node via one of Downlink Control Information (DCI) or a Medium Access Control (MAC) Control Element (CE), a first indication indicating muting at least one TRP of the one or more TRPs;

determining, based at least partly on the association and the first indication, one or more sets of the CSI-RS resources to be measured, wherein the determining comprises:

in response to the first indication indicating muting of the at least one TRP:

identifying a first set of resources comprising at least one resource from a group of the one or more groups of CSI-RS resources associated with the at least one TRP indicated for muting, in response to identifying the first set of resources, removing the first set of resources from the one or more sets of the CSI-RS resources to be measured, wherein the first set of resources comprises:

a single-TRP transmission configuration hypothesis, and a multi-TRP transmission configuration hypothesis involving the at least one TRP indicated for muting, and wherein the multi-TRP transmission configuration hypothesis comprises one of: a non-coherent joint transmission (NCJT) configuration, or a coherent joint transmission (CJT) configuration, and based on the measurement handling configuration, performing one of:

erasing one or more measurements previously performed for the first set of resources, and storing the one or more measurements previously performed for the first set of resources; and receiving, from the network node via one of the DCI or the MAC CE, a second indication indicating unmuting of the at least one TRP of the one or more-TRPs, wherein the second indication is received after the first indication and corresponds to the same TRP identifier;

determining, based at least partly on the association and the second indication, one or more sets of the CSI-RS resources to be measured, wherein the determining comprises:

in response to the second indication indicating unmuting of the at least one TRP:

identifying a second set of resources comprising at least one resource from a group of the one or more groups of CSI-RS resources associated with the at least one TRP indicated for unmuting, and in response to identifying the second set of resources, re-including, from among CSI-RS resources previously removed in response to the muting indication, the second set of resources in the one or more sets of the CSI-RS resources to be measured;

performing measurements on the one or more sets of the CSI-RS resources to be measured, wherein the performing the measurements comprises determining a signal quality for resources within each of the one or more sets of the CSI-RS resources; and sending, to the network node, a Channel State Information (CSI) report, wherein the CSI report is based on the performed measurements, and wherein the CSI report excludes results corresponding to any removed sets of resources.

2. The user equipment according to claim 1, wherein at least one of the one or more sets of the CSI-RS resources to be measured comprises one of:

one or more resources corresponding to at least one single TRP transmission configuration; or a set of resource pairs corresponding to at least one multi-TRP transmission configuration.

3. The user equipment according to claim 1, wherein the identifier comprises a set of Reference Signal (RS) resources.

4. A method, comprising:

obtaining, by a user equipment from a network node via Radio Resource Control (RRC) signaling, an association between one or more transmission-reception points (TRPs) and one or more groups of Channel State Information-Reference Signal (CSI-RS) resources for channel measurement, wherein the association comprises:

(i) for each of the one or more TRPs, an identifier comprising at least one of a Control Resource Set (CORESET) pool index or a physical cell identifier (PCI), and (ii) a measurement handling configuration, received via RRC signaling, that explicitly configures the user equipment to either erase or retain previously performed measurements for CSI-RS resources associated with a muted TRP;

receiving, at the user equipment and from the network node via one of Downlink Control Information (DCI)

or a Medium Access Control (MAC) Control Element (CE), a first indication indicating muting at least one TRP of the one or more TRPs;

determining, based at least partly on the association and the first indication, one or more sets of the CSI-RS resources to be measured, wherein the determining comprises:

in response to the first indication indicating muting of the at least one TRP:

identifying a first set of resources comprising at least one resource from a group of the one or more groups of CSI-RS resources associated with the at least one TRP indicated for muting, in response to identifying the first set of resources, removing the first set of resources from the one or more sets of the CSI-RS resources to be measured, wherein the first set of resources comprises:

a single-TRP transmission configuration hypothesis, and a multi-TRP transmission configuration hypothesis involving the at least one TRP indicated for muting, and wherein the multi-TRP transmission configuration hypothesis comprises one of a non-coherent joint transmission (NCJT) configuration, or a coherent joint transmission (CJT) configuration, and based on the measurement handling configuration, performing one of:

erasing one or more measurements previously performed for the first set of resources, and storing the one or more measurements previously performed for the first set of resources; and receiving, from the network node via one of the DCI or the MAC CE, a second indication indicating unmuting of the at least one TRP of the one or more-TRPs, wherein the second indication is received after the first indication and corresponds to the same TRP identifier;

determining, based at least partly on the association and the second indication, one or more sets of the CSI-RS resources to be measured, wherein the determining comprises:

in response to the indication indicating unmuting of the at least one TRP:

identifying a second set of resources comprising at least one resource from a group of the one or more groups of CSI-RS resources associated with the at least one TRP indicated for unmuting, and in response to identifying the second set of resources, including the second set of resources in the one or more sets of the CSI-RS resources to be measured;

performing measurements on the one or more sets of the CSI-RS resources to be measured, wherein the performing the measurements comprises determining a signal quality for resources within each of the one or more sets of the CSI-RS resources; and sending, to the network node, a Channel State Information (CSI) report, wherein the CSI report is based on the performed measurements, and wherein the CSI report excludes results corresponding to any removed sets of resources.

* * * * *